US006195768B1

(12) United States Patent
Green

(10) Patent No.: US 6,195,768 B1
(45) Date of Patent: Feb. 27, 2001

(54) SYSTEM AND METHOD FOR MONITORING HIGH SPEED DATA BUS

(76) Inventor: Samuel I. Green, 10951 Pem Rd., St. Louis, MO (US) 63146

(*) Notice: Subject to any disclaimer, the term of this patent is extended or adjusted under 35 U.S.C. 154(b) by 0 days.

(21) Appl. No.: 09/212,759

(22) Filed: Dec. 16, 1998

(51) Int. Cl.⁷ .................................................. G06F 13/00

(52) U.S. Cl. ............................. 714/47; 714/25; 710/106; 359/109

(58) Field of Search ........................ 710/106; 714/25–31, 714/47–53, 712–715, 799; 359/109–110

(56) References Cited

U.S. PATENT DOCUMENTS

| | | | |
|---|---|---|---|
| 4,355,423 | * 10/1982 | Theall | 359/175 |
| 4,527,270 | * 7/1985 | Sweeton | 714/47 |
| 4,823,305 | * 4/1989 | Holdren et al. | 710/30 |
| 4,850,043 | * 7/1989 | Winston | 359/119 |
| 4,959,782 | * 9/1990 | Tulpule et al. | 710/240 |
| 4,979,095 | * 12/1990 | Ghaffari | 710/106 |
| 5,093,910 | * 3/1992 | Tulpule et al. | 714/56 |
| 5,181,201 | * 1/1993 | Schauss et al. | 370/359 |
| 5,325,359 | 6/1994 | Jordon et al. | 370/85.1 |
| 5,367,670 | 11/1994 | Ward et al. | 395/575 |
| 5,402,431 | 3/1995 | Saadeh et al. | 371/67.1 |
| 5,423,008 | 6/1995 | Young et al. | 395/325 |
| 5,440,722 | 8/1995 | VanderSpek et al. | 395/183.19 |
| 5,696,910 | 12/1997 | Pawlowski | 395/280 |
| 5,729,335 | * 3/1998 | Green | 356/73.1 |
| 5,748,916 | 5/1998 | Conway et al. | 395/287 |
| 5,768,162 | * 6/1998 | Rupp et al. | 702/186 |
| 5,805,793 | * 9/1998 | Green | 395/183.08 |
| 5,809,220 | * 9/1998 | Morrison et al. | 714/12 |

\* cited by examiner

Primary Examiner—Christopher B. Shin
(74) Attorney, Agent, or Firm—Bryan Cave LLP; Daniel A. Crowe

(57) ABSTRACT

A system and method for monitoring messages containing command, status, and data words transmitted on a high speed, serial, asynchronous AS1773 fiber-optic data bus employing Manchester encoding includes a fiber-optical receiver connected to the data bus and adapted to receive and convert optical signals into message words containing either a command, a status, or a data word. The system also preferably includes a memory device having a number of storage locations adapted to receive and store the message words, which is organized in an optimal fashion to allow the system to monitor high speed data buses. Preferably, a logic device is operationally coupled to the fiber-optical receiver and adapted to serially receive and process each message word. The logic device controls the transfer of each message word into one of the memory locations of the message buffer. The logic device also generates an address for each of the transferred command and status words representing the address within the message buffer holding a particular command or status word. This command or status word address is stored into one of the memory locations of the pointer table. The logic device further stores characteristics of the message words and messages along with the message words into the memory device including whether a message is data or command/status, whether a message word has valid parity, whether all data and parity bits in a message word are validly Manchester encoded, and the relative time that the address of the first word in each message is stored into memory. This information is sufficient for host analysis software to diagnose and display bus traffic and aid in diagnostic testing of the AS1773 data bus.

21 Claims, 6 Drawing Sheets

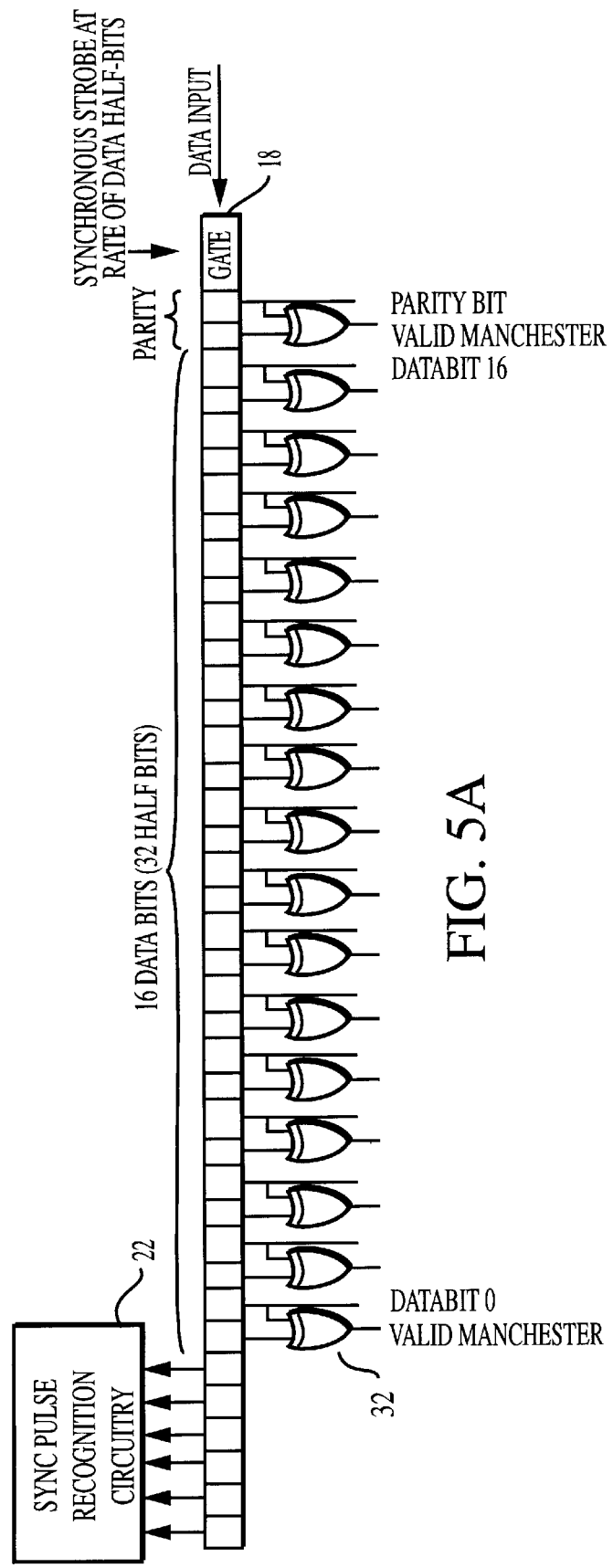

SYSTEM AND METHOD FOR MONITORING HIGH SPEED DATA BUS

FIELD OF THE INVENTION

The present invention relates generally to asynchronous, serial digital data buses and, more particularly, to a system and method for monitoring data on a high speed fiber-optical data bus.

BACKGROUND OF THE INVENTION

A data link, data bus, or data network is an array of data transmitters and receivers arranged to transmit data bi-directionally between two or more users over wire, optical fiber, or another transmission medium. Diagnostic instruments that monitor, process, and display the data communicated over these links, buses, or networks are necessary for integrating and trouble shooting complex systems. A bus monitor is one such diagnostic instrument that receives data transmitted over a data link, data bus, or data network and extracts selected information to be displayed or otherwise used. For example, the bus monitor may be connected to a host computer that displays the data in various formats to aid in solving various integration problems. In military aircraft applications, a bus monitor is commonly used as flight test instrumentation to verify data bus performance and/or the performance of a subsystem attached to the bus.

One type of data bus used in aerospace applications is the SAE AS1773 20 Mbps multiplexed command/response fiber-optic data bus. As is known to those skilled in the art, MIL-STD-1773, entitled "Fiber Optics Mechanization of an Aircraft Internal Time Division Command/Response Multiplex Data Bus," is a 1 Mbps fiber-optic version of the popular 1 Mbps copper wire MIL-STD-1553 data bus, and provides the option of using fiber-optics in military avionics systems in place of MIL-STD-1553. MIL-STD-1553 defines a serial asynchronous data bus employing Manchester encoding on which the messages are time multiplexed among users, allowing several users (nodes) to share the same resource (transmission medium) by using it at different times. MIL-STD-1773 specifies a 1 Mbps protocol that is identical to MIL-STD-1553, with the difference confined to the transmission medium. MIL-STD-1773 specifies a fiber-optic medium, while MIL-STD-1553 specifies an electrical medium. AS1773 includes both 1 Mbps and 20 Mbps protocols. The 20 Mbps fiber-optic AS1773 data format is identical to the 1 Mbps format, except that the rate of data transmission is substantially higher, and the AS1773 protocol differs in having a preamble before each message to aid in recovering the clock at the higher data rate. The AS1773, MIL-STD-1773, and MIL-STD-1553 data buses all use Manchester encoded data (Manchester II bi-phase level) to send messages of up to 33 words, each consisting of 16 data bits followed by a single parity bit and preceded by a characteristic synchronization pulse that consists of an easily recognizable illegal Manchester pattern.

Use of the 20 Mbps AS1773 bus has heretofore been limited because there is no conventional diagnostic instrument available to provide a monitoring function for this high speed fiber-optic data bus. Such test instrumentation is necessary to integrate equipment into applications, for example aircraft control systems. The 20 Mbps AS1773 bus provides a twenty times speed advantage over the popular MIL-STD-1553 bus and the additional advantages of being immune to Electro-Magnetic Interference (EMI), as well as not being a source of EMI. The AS1773 bus was developed primarily for space applications, so the components are designed to provide the additional benefit of being immune to single event upsets due to ionizing radiation. In order to increase the ease of integrating the 20 Mbps AS1773 data bus into various applications, it would be desirable to provide a system and method for monitoring a high-speed data bus of the serial, asynchronous type employing Manchester encoding, which provides a means to monitor the data transmitted at such a high data rate. Preferably, the system would retrieve messages from the data bus and store the messages for processing and analysis.

SUMMARY OF THE INVENTION

A system and method for monitoring a high speed data bus which transfers data and commands and is of the serial, asynchronous type employing Manchester encoding is described herein. A bus monitor preferably includes a fiber-optic receiver that provides communication with the bus for receiving and processing message data from the bus, a logic device that receives and processes the message data, and a memory device adapted to store data and commands received via the bus. The bus monitor is particularly advantageous for use with a data bus employed according to the AS1773 data bus protocol.

The fiber-optic receiver preferably receives the optical signal from the data bus, converts the optical signal into an electrical waveform, and transmits the electrical waveform to the logic device. The logic device preferably receives the electrical waveform from the fiber-optic receiver, performs logical sequences, and sequentially transmits message words to the memory device. The memory device preferably receives the message words from the logic device, sequentially stores the message words, and permits the stored data to be accessed by a host computer.

Preferably, the system of the present invention monitors messages transmitted on a high speed, serial, asynchronous data bus employing Manchester encoding, wherein the data bus transmits the messages as a sequence of optical signals, the messages containing command, status, and data words. The preferred system includes an fiber-optical receiver connected to the data bus and adapted to receive the optical signals. The fiber-optical receiver converts each optical signal into an electrical signal which constitutes a message word containing either a command word, a status word, or a data word and sends the message word into a logic device. The system also preferably includes a memory device having a number of storage locations adapted to receive and store the message words. Preferably, the memory device is organized in an optimal fashion to allow the system to monitor high speed data buses. Preferably, the logic device is operationally coupled to the fiber-optical receiver and adapted to receive and process message words serially. The logic device controls the transfer of each message word into one of the memory locations of a message buffer. The logic device also generates an address word for each of the transferred command and status words representing the address within the message buffer holding a particular command or status word. The logic device stores this command word address or status word address into one of the memory locations of a pointer table. As each message consists of a command word or a status word followed by a number (0–32) of data words, the entries in the pointer table indicate the first word of each message stored into the message buffer.

In a preferred embodiment, the logic device senses the end of a message and stores a time stamp and the next pointer address into the next memory location of the pointer table. The time stamp is preferably stored at the same time that the logic device is storing the next command or status word address and is stored into the high word of the long memory word holding the command or status word address.

The memory device is preferably coupled to a host computer capable of analyzing, processing and displaying the received message words and information about the received message words that aid in system integration and diagnosis of system faults. The logic device and the host computer interact in the processing of the data. For example, the logic device may signal the host computer (e.g., via an interrupt) when either the message buffer or the pointer table is full. The logic device may pause at this time, to allow the host computer to read and process the data. Alternatively, the logic device may continuously transfer message words into the message buffer. In this embodiment, the host computer preferably reads and processes the message words in a rotating buffer memory sufficiently fast such that stored data is processed before it is overwritten by subsequent message words.

In another embodiment, the logic device generates a series of status flags for each received message word. For example, the logic device may calculate the validity of the Manchester encoded data and may also cross-check the validity of the parity bit associated with each message word. Additional status flags may indicate whether the message word synchronization pulse is of one polarity indicating receipt of a command or status word or of another polarity indicating receipt of a data word. Preferably, the logic device stores these status flags along with each message word stored into the memory device.

The present invention also includes a method for monitoring messages transmitted on a high speed, serial, asynchronous data bus employing Manchester encoding, wherein the data bus transmits the messages as a sequence of optical signals and wherein the messages include command, status and data words. A memory device is provided having a plurality of storage locations adapted to receive and store the message words. The memory device is preferably partitioned into two separate regions including a message buffer and a pointer table and two special purpose locations for pointing (addressing) into the pointer table and for passing interrupts. The message buffer has a number of memory locations adapted to store either a command, status, or data word. Preferably, each of the memory locations in the message buffer storing a command or status word has an associated address identifying the memory location holding the first message word of an incoming message, i.e., a command word or a status word. The pointer table has a number of memory locations, each memory location in the pointer table intended to store an address associated with one of the messages in the message buffer, generally the address of the first memory location of one of the messages in the message buffer storing a command word or a status word. Each of the optical signals transmitted on the data bus is optically received and converted into a message word comprising either a command, a status, or a data word. Each of these message words is then sequentially stored into one of the memory locations of the message buffer. For each command or status word received and stored, the method includes the step of generating and storing an address pointing to the address within the memory buffer storing a command or status word into one of the memory locations of the pointer table and the additional step of writing the address to another single location that identifies the address of the pointer to the address of the last message written.

BRIEF DESCRIPTION OF THE DRAWINGS

These and other features, aspects, and advantages of the present invention will become better understood with regard to the following description, appended claims, and accompanying drawings wherein:

FIGS. 5A & 5B illustrate an alternative embodiment of the bus monitor wherein the bus monitor uses oversampling techniques.

These drawings are provided for illustrative purposes only and should not be used to unduly limit the scope of the present invention.

DETAILED DESCRIPTION OF THE INVENTION

In the following detailed description numerous specific details are set forth in order to provide a thorough understanding of the present invention. However, it will be understood by those skilled in the art that the present invention may be practiced without these specific details. In other instances, well known methods, procedures, components and circuits have not been described in detail so as not to obscure aspects of the present invention.

The bus monitor system of the present invention may preferably be used with an AS1773 fiber-optical data bus, which transmits Manchester encoded data, buses derived from this bus, and other future high speed buses derived from MIL-STD-1553 or MIL-STD-1773 (whether fiber-optic or copper). As is known to those skilled in the art, Manchester encoded data uses two half-bits to transmit a single bit of useful data. The two half-bits must be different so that there is always a high-to-low or low-to-high transition between the two half-bits, i.e., a legal Manchester bit always has a mid-bit transition. The direction of this mid-bit transition (e.g., low-to-high) indicates whether the value of the bit is zero or one. Manchester encoding is used in connection with AS1773 fiber-optical data buses because it has certain advantageous properties. Manchester data has a 50% duty cycle over each bit period when data is present, allowing simpler receiver circuitry. Manchester data is encoded by performing a logical exclusive-or of data with the reference clock. A large clock component in the received data allows easy recovery or regeneration of a reference clock in the optical receiver. This clock is then available to strobe the received data into decoding circuitry at the proper time.

Figure 2:
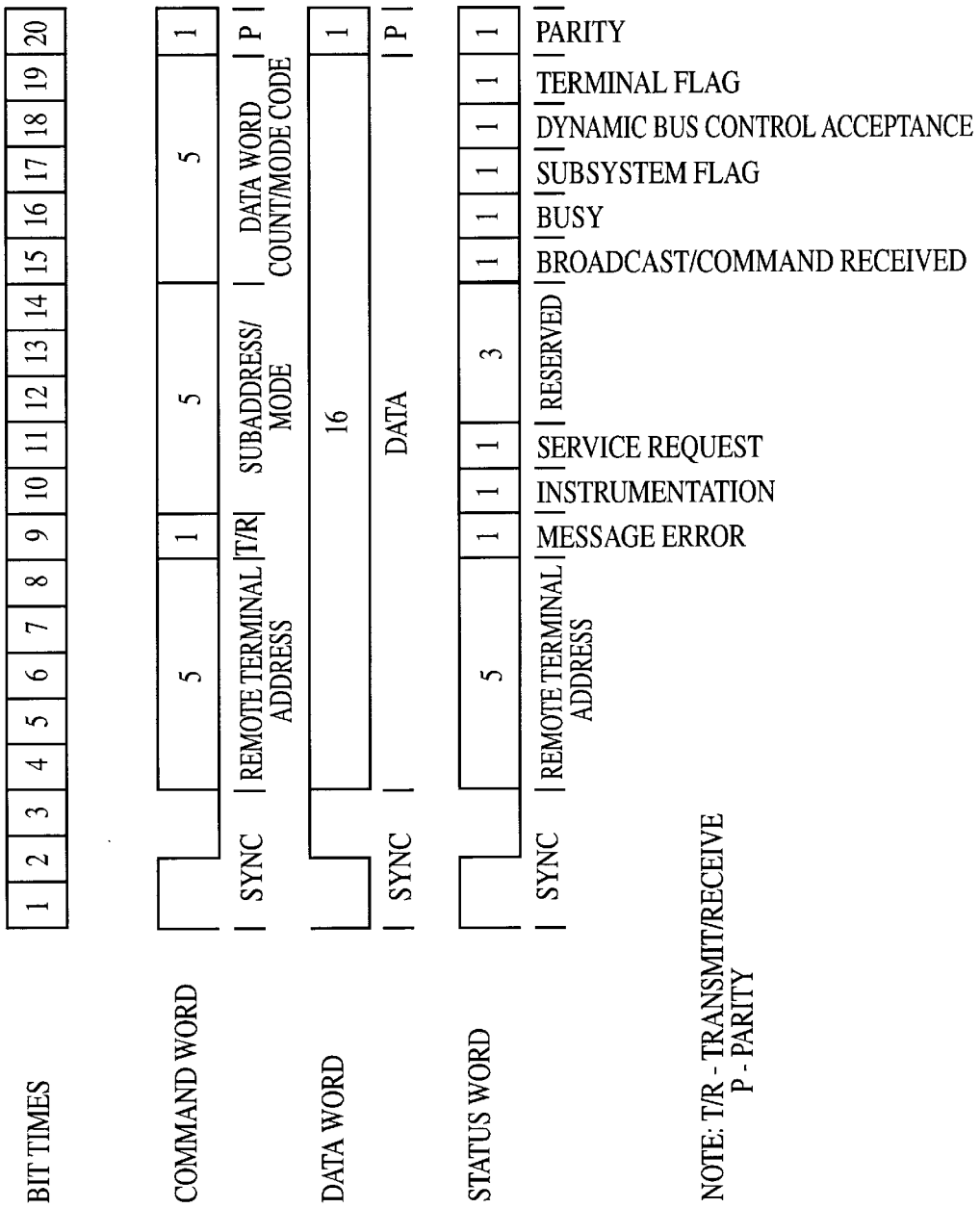
FIG. 2 is a diagram of representative word formats used in MIL-STD-1553, MIL-STD-1773, and AS1773 data transmission, and include a sync pulse followed by 16 data bits followed by a parity bit.

It will be appreciated by those skilled in the art that the present invention is adaptable to various types of fiber-optic data buses, data links, and networks of the serial asynchronous type employing Manchester encoding. As shown in FIG. 2, the AS1773 fiber-optic data bus is a command/response data bus using Manchester encoded data to send messages of 16 bit data words followed by a single parity bit and preceded by characteristic synchronization pulses which consist of easily recognized illegal Manchester patterns, specifically certain patterns which have no mid-bit transition. The 20 Mbps fiber-optic AS1773 data format is identical to the 1 Mbps fiber-optic MIL-STD-1773 format except on a faster time scale and the addition of a 16 bit preamble to enable clock recovery before the synchronization pulse of the first message word. Both AS1773 and MIL-STD-1773 are based on the 1 Mbps copper wire MIL-STD-1553 format except that the modulation is by the presence and absence of light on the fiber in place of voltage levels on copper wires. According to the MIL-STD-1553 standard, data transmissions between devices on the bus (including remote terminals, bus controllers, and monitors), are called messages which consist of a command or status word followed by zero to 32 data words. Each message is separated in time by a minimum inter-message gap of 4 μsec and 1.2 μsec for 1 Mbps and 20 Mbps respectively.

Figure 1:
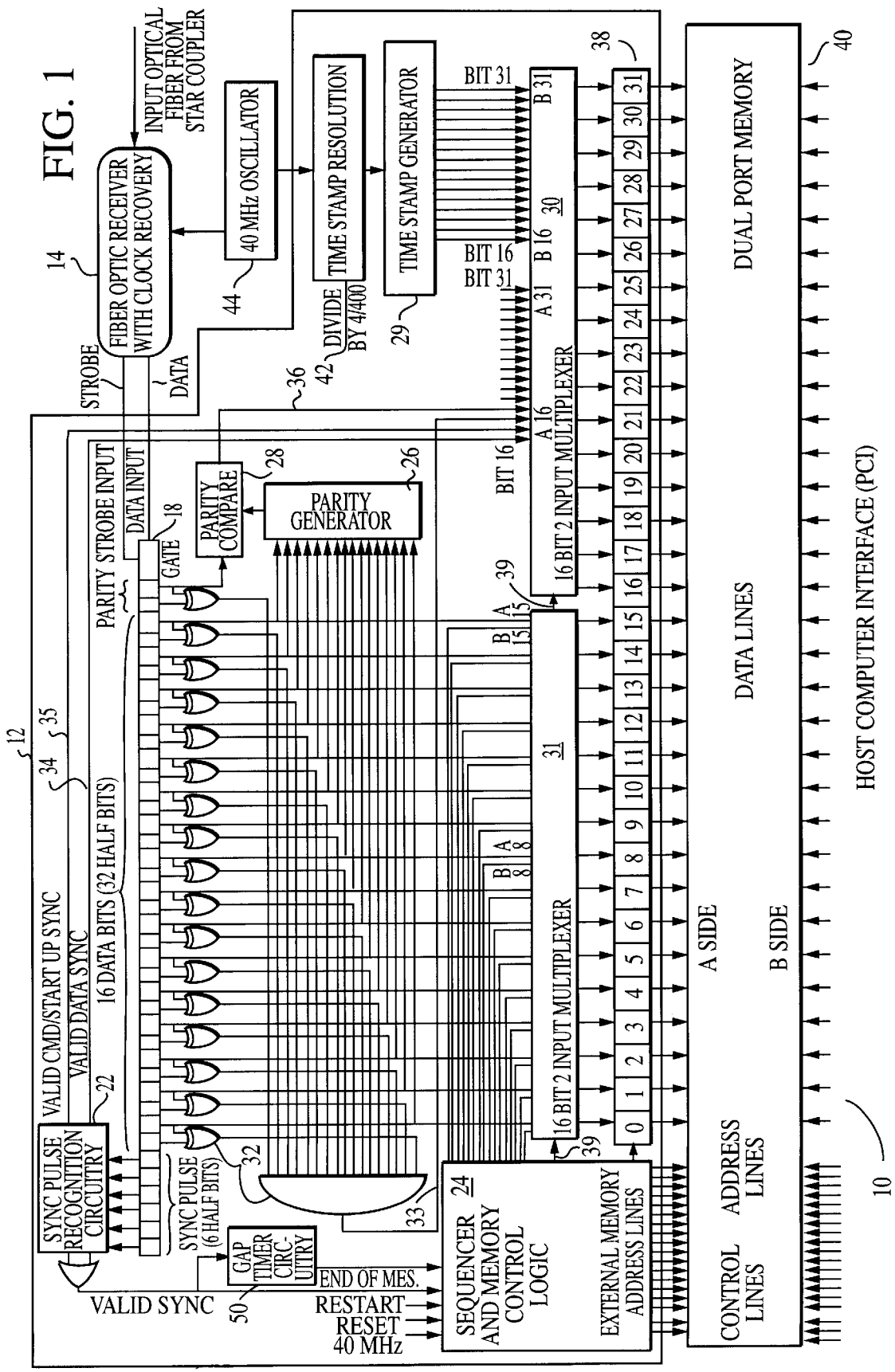
FIG. 1 is a diagram showing one embodiment of the bus monitor of the present invention.
Figure 3:
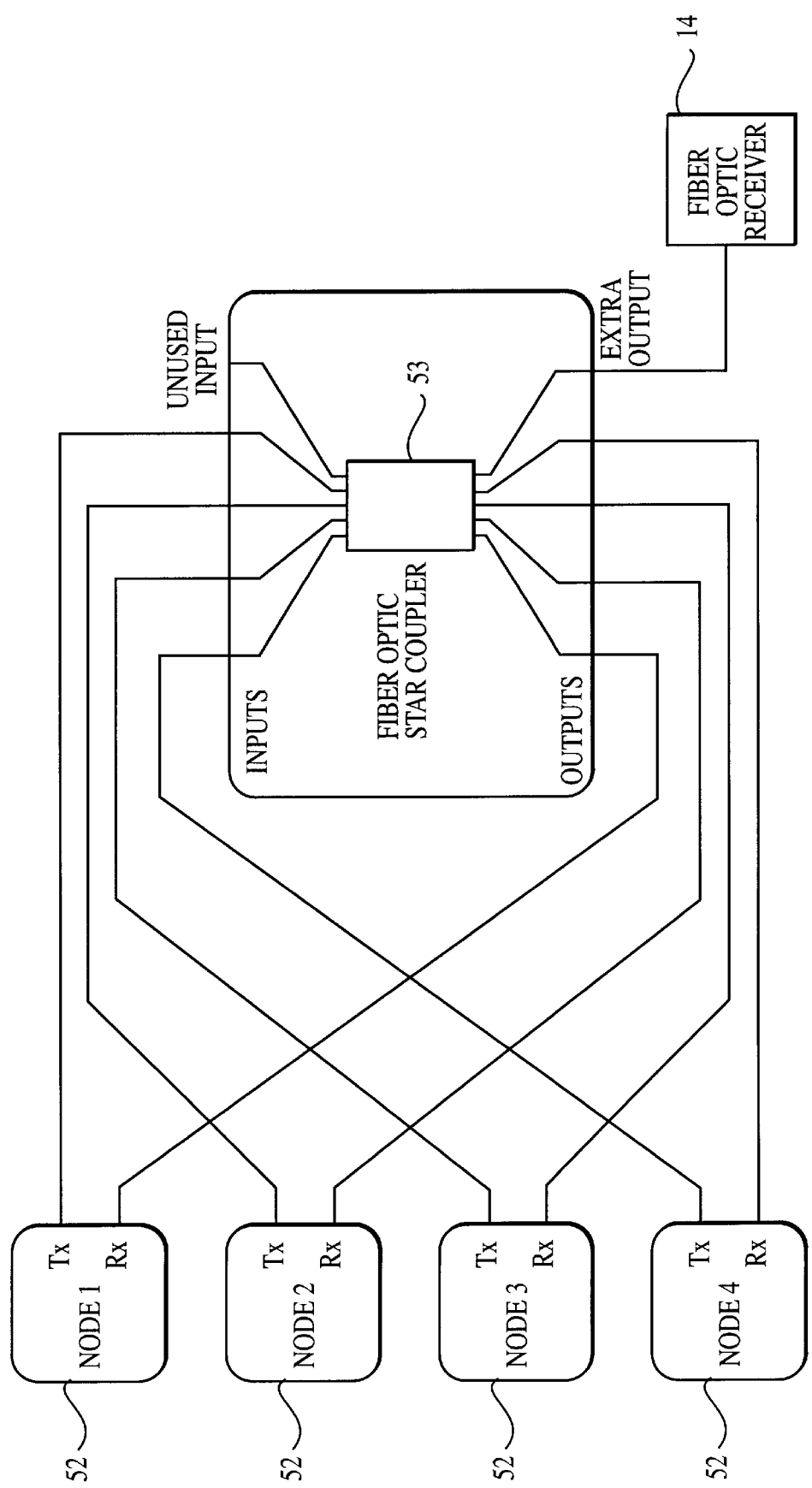
FIG. 3 is a diagram illustrating the fiber-optic receiver of the present invention connected to a fiber-optic star coupler.

As shown in FIG. 1, the presently preferred bus monitor system 10 includes a logic device 12 that is operationally coupled to a fiber-optical receiver 14. The fiber-optical receiver 14 provides a connection to a high speed data bus shown in FIG. 3 so that the logic device 12 can receive and monitor message data in the form of binary words from the bus. The fiber-optical receiver 14 receives optical signals from a fiber-optical data bus, such as an 20 Mbps AS1773 fiber-optic data bus. As is known, a MIL-STD-1773 or AS1773 data bus typically includes multiple nodes 52, each with a fiber-optic transmitter and a fiber-optic receiver, as shown in FIG. 3. According to the MIL-STD-1773 and the AS1773 standards, the nodes 52 are connected into a bus by attachment to a fiber-optic star coupler 53. The star coupler 53 provides each fiber-optic receiver on the bus an equal share of all of the combined signals from the fiber-optic transmitters. The protocol limits the number of nodes on a bus to 31, but the available transmitter power typically limits the number of nodes to 16 or fewer. A typical installation has extra unused inputs and outputs on the star coupler 53. Thus, the fiber-optical receiver 14 may be coupled to an unused output of the star coupler 53 and would then be capable of receiving a sample of messages from all of the nodes 52 of the multiplexed data bus. The fiber-optical receiver 14 converts the received optical signals into an accurate corresponding electrical waveform and provides this electrical waveform to the logic device 12 as a series of sequential binary data bits.

The optical signals are preferably Manchester encoded defining a message word that extends for a duration of 20 bit periods (40 half-bits). FIG. 2 illustrates the data word formats configured in accordance with AS1773. Each 20 bit period message word (i.e., either a command word, a data word, or a status word) includes a three bit period sync pulse, followed by 16 bits of data, and then followed by a single parity bit. Both the command and status message words include a sync pulse comprised of three half-bits of logical one followed by three half-bits of logical zero. The data word format includes a sync pulse comprised of three half-bits of logical zero followed by three half-bits of logical one. Both of these sync pulses represent illegal Manchester encoding because there are no mid-bit transitions at the 20 Mbps rate and are used to label the type of incoming message word as either command/status or data and to synchronize the receiver to the incoming message. Thus, the sync pulse both serves the purpose of word identification and synchronization. The sync pulse is unique and is not the same as the waveform for data bits. The sixteen bit data field for a command word includes the remote terminal address, a transmit/receive bit, the sub-address or mode selection, and a data word count or mode code. The sixteen bit data field for a status word contains the remote terminal address and information bits describing the status of the transmission. A command word or a status word is always the first word in a message, and may be referred herein as a command/status word, i.e., a message word that is either a command or a status word.

Preferably, Manchester encoded data at the rate of the Manchester half-bits are transmitted across the bus and are received by the fiber-optical receiver 14. The fiber-optical receiver 14 preferably converts the received optical signal into an accurate corresponding electrical waveform and supplies the electrical waveform and recovered clock pulses at the rate of the half-bits to the outputs of the fiber-optical receiver 14 at logical electrical levels. By way of example, one acceptable fiber-optical receiver 14 is incorporated into a transceiver manufactured by The Boeing Company under part no.900-60133-1. This fiber-optical receiver operates at either 1 Mbps or 20 Mbps. The transmitter portion of the Boeing transceiver is not needed for the bus monitor application. According to the AS1773 standard, each receiving device attached to the bus (including a bus monitor) must decode incoming messages and regenerate clock information derived from the message. Regeneration of the clock pulses is a preferred feature of this receiver because the clock or strobe pulses control the time when the following circuitry (i.e., within the logic device 12) accepts or latches the data. The fiber-optical receiver 14 preferably includes special circuitry which uses an external 40 MHz reference (for example, from oscillator 44) and rapidly regenerates clock after only a few preamble transitions and provides a strobe pulse for each half-bit of received data which it uses internally for its own processing and also provides an external signal to establish the precise time that following circuitry is to latch the presented half-bit data signal. The strobe pulses only appear at the receiver output when data is valid, a unique feature of the Boeing receiver that prevents erroneous indications of sync pulses when not present.

The fiber-optical signal further preferably comprises a timing or clock signal. The fiber-optical receiver 14 preferably recovers the data signal and the clock signal and transmits the data signal and the clock signal to the logic device 12 as data and clock strobes. The clock signal preferably controls the time at which the logic device accepts or latches the data.

The data and clock strobe outputs from the fiber-optical receiver 14 preferably pass as inputs to the logic device 12, which performs and controls all bus monitoring, processing and data storage functions. Thus, the logic device 12 is preferably programmed to perform certain logical sequences, including (as more fully described below) strobing data into a 40 bit serial-input parallel-output shift register 18, recognizing and signaling the occurrence of an illegal Manchester synchronization pulse pattern (111000 or 000111), indicating the polarity of the sync pulse to define whether the sync pulse specifies a data or command/status word, determining and indicating whether all of the data bits are validly Manchester encoded, latching the sixteen bit data field, calculating the parity of the data bits within the sixteen bit data field, and determining whether the parity bit associated with the 16 data bits is valid. The logic device 12 may preferably reside in an Electrically Programmable Logic Device (EPLD) or other logic array device such as an Application Specific Integrated Circuit (ASIC).

The logic device 12 gates each data message word (comprising, for example, as shown in FIG. 1, 20 logical bits comprised of 40 half-bits) into the shift register 18. Preferably, a message word is strobed into the shift register 18 from the fiber-optical receiver 14 as commanded by the strobe pulse issued by the fiber-optical receiver 14 to the logic device 12. The input message preferably continues to be input and to be shifted left so that the current message word becomes overwritten by the next message word. Thus, the logic device 12 has until the next occurrence of a half-bit strobe pulse to latch the message word and flag bits into the holding register 38 and until the next occurrence of a synchronization pulse pattern (in the next message word) to process the received and latched message word.

The logic device 12 preferably recognizes a synchronization pulse and determines whether the sync pulse is a command/status sync pulse or a data sync pulse. The illegal Manchester sync pulse is divided into two parts (each three half-bit periods wide) received either as a logic level 1 voltage waveform followed by a logic level 0 voltage waveform or vice-versa. The sync order identifies the word: command and status words have the logic level 1 waveform first while a data word has the logic level 0 waveform first. Sync pulse recognition circuitry 22 receives the most significant six half-bits of the shift register 18 and determines whether such six half-bits correspond to one of the two illegal Manchester codes representing either a command/status sync pulse (111000) or a data sync pulse (000111). Upon detecting either type of sync pulse, the sync pulse recognition circuitry 22 signals the sequencer and memory control logic circuit 24 to indicate an occurrence of a valid sync pulse and that a new message word is contained in the shift register 18 and recognized by the sync recognition circuitry 22. The sequencer and memory control logic circuit 24 is responsible for latching the sixteen bit data field of the message word into the holding register 38. Additionally, as discussed below, the sequencer and memory control logic circuit 24 also latches status flags along with each data field.

Preferably, the logic device 12 generates four status flags or indications. The first status flag (as indicated by input signal 36 to the upper word multiplexer 30) indicates the validity of the parity bit of the incoming message word. This first status flag preferably indicates whether the parity computed for the received data word matches the parity computed when the word was transmitted. Preferably, the logic device 12 includes parity generation circuitry 26, which receives all 16 data bits from the shift register 18 and generates the parity of the 16 bits. This parity value is then compared with the parity bit (bit 20 of the incoming data word) by the parity compare logic 28 and the result is indicated by signal 36 input to the upper word multiplexer 30. This parity check is generally sufficient to catch a single (or odd number of) erroneous data bit(s).

The second status flag generated by the logic device 12 indicates whether the Manchester encoding of all data bits in the incoming data word was valid. Preferably, the logic device 12 includes Manchester validity circuitry 32 that generates an exclusive-or of all of the half-bits of the 16 data bits of the incoming data word, as well as the incoming parity bit, and then performs a logical AND operation on the results of the 17 exclusive-or operations. This Manchester validity circuitry 32 will detect a failure in the Manchester encoding of any data bit in the incoming data word (the 16 bits of data and the single parity bit). The result of this Manchester validity circuitry 32 is indicated by signal 33 and is transferred to the upper word multiplexer 30.

The two remaining status flags generated by the logic device 12 indicate whether the sync recognition circuitry 22 determined that a valid data sync or command/status sync pulse is contained within the upper six half-bits of the shift register. These two status flags preferably reflect the polarity of the synchronization pulse and indicate whether the word is a data word or a command/status word. Both command and status words preferably use the same synchronization pulse polarity. Other features of the command/status word, especially message context and content, are preferably used to determine whether a word is a command word or a status word. As generally discussed above, the valid data sync signal 34 will be set when the upper six bits of the shift register contain the logic sequence 000111. The valid command/status sync signal 35 will be set when the upper six bits of the shift register contain the logic sequence 111000. Both of these two flags are sent to the upper word multiplexer 30.

Each of these four status flags 33, 34, 35, and 36, are transferred to the upper word multiplexer 30, which then selects these flag bits for write to the upper memory word of the 32-bit holding register 38, which is then transferred into the memory device 40 when writing a command word, a status word, or a data word.

The logic device 12 moves all data bits from the shift register 18 into the sixteen least significant bits of a 32 bit holding register 38 via the lower word multiplexer 31. The four status flags are stored in the next four most significant bits, i.e., the four least significant bits of the most significant 16 bit word of the holding register 38, through the upper word multiplexer 30. The two 16 bit 2-input multiplexers 30 and 31 may be implemented as one contiguous 32 bit 2-input multiplexer, rather than the two shown in FIG. 1.

Preferably, the logic device 12 also contains circuitry to generate a time stamp, representing the time when the logic device 12 senses a gap between message words after the last word in a message. The time stamp may be generated using any number of conventional methods. For example, an oscillator 44 may be included, such as a 40 MHz oscillator for use in conjunction with the 20 Mbps AS1773 fiber-optic receiver. The oscillator 44 may also preferably provide timing reference signals to the logic device 12 and the sequencer and memory control logic 24. To provide sufficient time resolution for short or long time scale resolution, the logic device may be provided with a discrete input 42 to select the time resolution of the time stamp. For example, the discrete may preferably select whether the local 40 MHz clock (25 ns cycle) generated by the oscillator 44 is divided by 4 for 100 ns resolution or by 400 for 10 $\mu$s resolution. The divided clock is preferably counted by a 16 bit binary counter in the time stamp generator 28 and presented to the upper word multiplexer 30.

The bus monitor system 10 preferably includes a memory device 40, for example a dual-port memory device, that receives the message words from the logic device 12 and stores the data in memory, and simultaneously permits stored data words to be read by a host computer. The memory device 40 may be external to the logic device 12 or may be integrated as a single packaged monolithic device. One acceptable memory device 40 is a high speed 8K×16 dual-port static ram manufactured by Integrated Device Technology, Inc., under part number IDT7025S/L. Although an external dual-port memory device is one preferred implementation, many other types of memory devices and configurations may be used and are within the scope of the present invention. For example, the memory device 40 may be one or more single-port memory chips controlled by logic to enable a host computer access on a non-interfering basis or any other of a variety of industry standard mass storage devices which are compatible. Each message word stored by the memory device 40 will preferably comprise sixteen bits originating from the sixteen bit data field of the incoming message word. The sixteen bit data field may represent a command word, a status word, or a data word.

As is commonly known, the information contained in the memory device 40 is sufficient to conduct significant analysis of the message words received by the fiber-optical receiver 14 from the fiber-optical data bus. For example, software running in a host computer operationally connected to the memory device 40 preferably reads the data stored in the memory device 40, analyzes the stored data, and presents it for display. The host computer is preferably adapted with standard microprocessor data, address, and control bus interfaces, such as a PCI bus interface or another type of conventional interface such as VME, EISA, Compact PCI, or MultiBus. This interface may be eliminated altogether by direct connection of a dedicated CPU to the DPRAM in a dedicated stand-alone instrument. In this manner, diagnostics may be performed to identify and trace errors, such as errors with the bus itself or errors occurring in one or more of the remote terminals or the bus controller attached to the star coupler.

Figure 4:
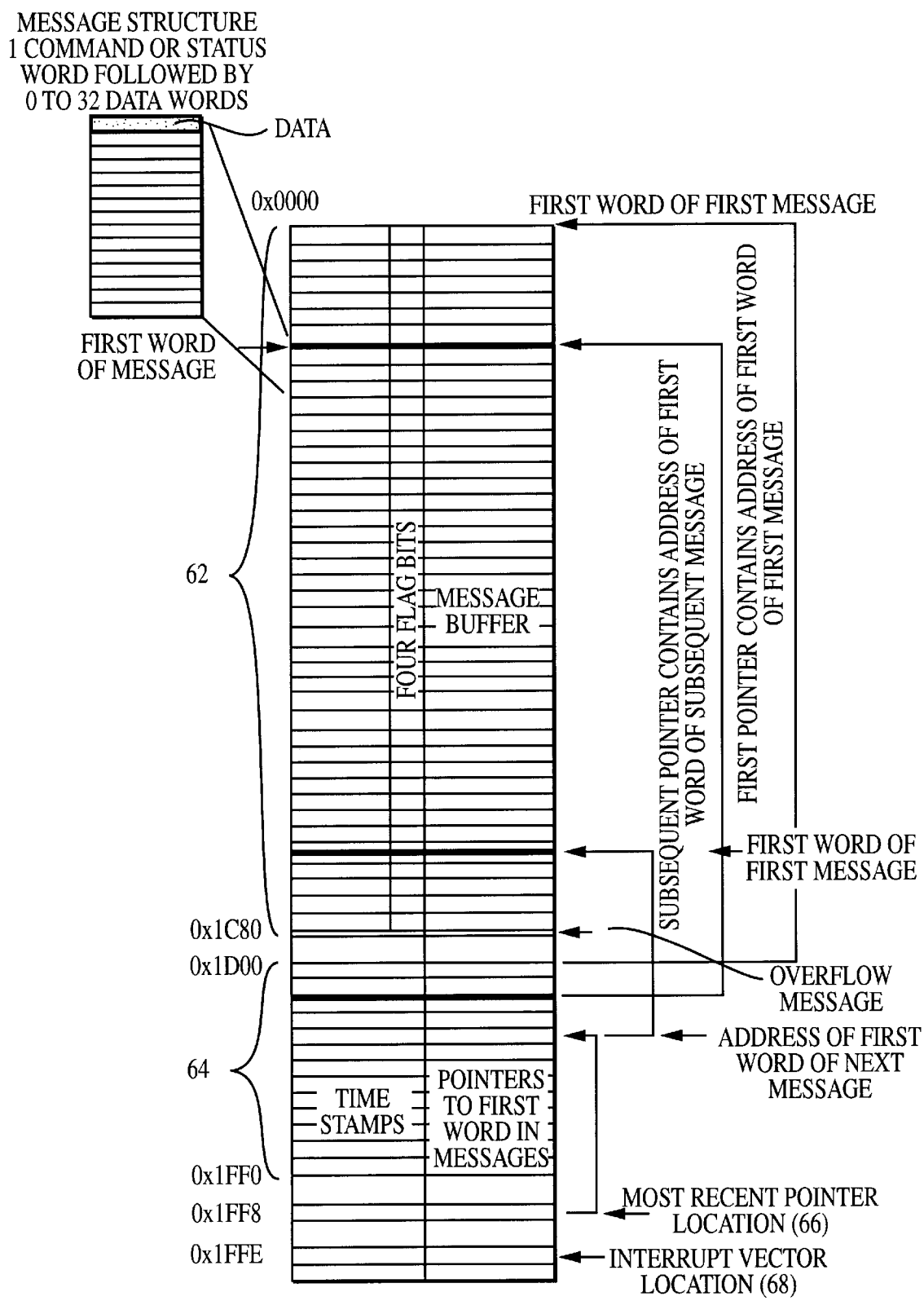
FIG. 4 illustrates a representative memory map of the memory device and host computer in accordance with one embodiment of the present invention.

The memory contained within the memory device 40 may be organized in a number of unique ways. As illustrated in FIG. 4, the memory may include a message buffer 62, a pointer table 64, a last pointer location 66, and (in certain embodiments) an interrupt vector location 68. As those skilled in the art will appreciate, while the logical memory device 40 may be a separate physical unit, the function of the memory device 40 may be allocated across a number of different physical units. For example, a separate physical memory unit may include the message buffer 62, while portions of the memory associated with the host computer may contain the pointer table 64. Thus, the physical layout of the memory for the memory device 40 may be distributed among a number of physical units as required for a particular application, and references herein to a logical memory device 40 may be considered as residing on several different physical units. The pointer table 64 generally contains a number of memory locations, each holding an address to a memory location within the message buffer 62. Preferably, each entry in the pointer table 64 addresses the memory location within the message buffer 62 storing a command/status word. The most recent pointer location 66 preferably contains an address pointing to a memory location within the pointer table 64 containing the address of the next message to be stored within the message buffer 64. The interrupt vector location 68 may be used with certain embodiments to pass the address of the last stored message (i.e., an address pointing to a memory location containing a command/status word). In other embodiments, the interrupt vector location 68 may be used to signal the host that the message buffer 62 or the pointer table 64 is full.

As the logic device 12 receives a stream of message words, the logic device 12 continues to write the sixteen bit data fields of these message words in consecutive locations within the message buffer 62 within the memory device 40 (as shown in FIG. 4). The message buffer 62 is preferably organized as sequential messages (a command or status word followed by up to 32 data words). The message buffer 62 is preferably at least 20 bits wide, sufficient to hold the sixteen bit message word along with its associated four status flags.

It is preferable, in each of the embodiments described below, to store the four status flags associated with a particular message word into the high word of the memory location within the memory buffer 62 storing the message word. Additionally, a time stamp may be added to each received message to aid in analysis. The logic device 12 preferably generates a time stamp and stores it with each message into the memory device 40. For example, each time that the logic device 12 stores the address of the next command or status word in pointer table 64, the logic device 12 stores the relative time. The pointer table 64 uses only 16 bits of the 32 bit wide memory and thus allows the 16 bit time stamp to be stored to the upper word of each memory location of the pointer table 64 storing an address to a command or status word in the message buffer 62.

The transfer of data from the holding register 38 into the memory device 40 is controlled by the sequencer and memory control logic circuit 24. The sequencer and memory control logic circuit 24 provides a select signal 39 to the multiplexers 30 and 31 to write the status flags along with command, status, and data words in the message buffer 62 of the memory device 40. The select signal 39 also signals the multiplexers 30 and 31 to provide message pointers and time stamps to the pointer table 64 of the memory device 40, as described below. The sequencer and memory control logic 24 includes additional registers that maintain addresses into the message buffer 62 and the pointer table 64 within the memory device 40. These registers write their contents as addresses to the address bus of the memory device 40 when storing data into the memory device 40, such as message data, pointer (address) data, and the last pointer location. The sequencer and memory control logic circuit 24 transfers the message word contents of the holding register 38 into the dual port memory 40 very soon after the message word appears as allowed by normal setup and hold times.

The present invention includes a number of techniques for writing to, and organizing the data within, the memory device 40, as well as reading the data therefrom. In one embodiment, the logic device 12 preferably writes the command, status, and data words (along with their associated status flags) to the message buffer 62 of the memory device 40 sequentially starting from the lowest available location (address) within the message buffer 62 in the memory device 40. After writing each word, a counter preferably increments a pointer to the next sequential memory address so that the sequencer and memory control logic circuit 24 properly addresses the location within message buffer 62 of the memory device 40. The counter is controlled by the sequencer and memory control logic circuit 24, which controls and provides the address of where the word should be stored to the memory device 40 through the control and address input lines of the memory device 40. In this manner, all input message words preferably become stored sequentially in memory up to some limiting address, at which the process ceases. The memory device 40 will preferably contain a series of message words, each containing 16 bits of data and four bits of status flags. Command words and status words will preferably have a characteristic pattern of flag bits, typically '1110' (or 0xE in hexadecimal notation) to indicate that there were no parity errors, no Manchester errors, and that the word is a command word or a status word. Data words will also preferably have a characteristic pattern of flag bits, typically '1101' (or 0xD) to indicate that there were no parity errors, no Manchester coding errors, and that the word is a data word.

After the last word in a message arrives, detected as described below, the sequencer and memory control logic circuit 24 writes the address of the first word of the next message and, if desired, the time stamp into the holding register 38 via the multiplexer 30. This information is then preferably transferred into the next available location within the pointer table 64. Then the sequencer and memory control logic circuit 24 also preferably writes the address of the pointer most recently written within the pointer table 64 to the most recent pointer location 66 within the memory device 40 providing the host computer with a pointer to the memory location containing the address of the next message to be stored within the message buffer 62. When the message buffer 62 or the pointer buffer 64 fills to or beyond a predetermined maximum limit, the sequencer and memory control logic circuit 24 preferably writes a value to the interrupt vector location 68 in the memory device 40 to signal the host computer, and the process halts until the host computer services the bus monitor and restarts the process.

The logic device 12 preferably tracks messages and determines when a new message arrives (so that it may appropriately update the pointer table 64). In one embodiment, the logic device 12 preferably senses the presence of an inter-message gap (i.e., a dead time between input messages). As is commonly known, according to 1773 message protocol, there is no gap between words in a message but there is a minimum gap between messages (wherein the message consists of a single command or status word, followed by zero to 32 words of data). Thus, the logic device 12 may include gap timer circuitry 50, which tracks the time between valid sync pulses and signals the sequencer and memory control logic 24. A delay or gap extending for at least a certain period of time such as 1.1–1.2 $\mu$sec for the 20 Mbps AS1773 standard indicates the end of a message (comprising a command word or status word and followed by zero to 32 other data words). Alternatively, the logic device 12 may monitor the status flags to determine the presence of a command or status word (which will have the four status flags set to 1110) and then write the address within the memory device 40 storing such command or status word to the interrupt vector location 68 of the memory device 40.

In one embodiment, referred to as the "rotating buffer" mode, the message data is written to the message buffer 62. When a predetermined limit is exceeded, the message data again is written to the beginning of the message buffer 62 and overwrites previous data. In this embodiment, it is the task of the host computer connected to the memory device 40 to build the pointer table 64 (i.e., a table of addresses) as well as to read and process the message data before it is overwritten. The address of the first word of each message (command/status word) is written to the interrupt vector location 68 in the memory device 40 to pass these addresses to the host for the purpose of building the pointer table 64.

In an second embodiment, referred to as the "snapshot" mode, the input of data into the memory device 40 is stopped when the message buffer 62 of the memory device 40 is full. Analysis and display of the data is preferably performed during this pause. Then another "snapshot" preferably occurs. This embodiment works successfully at the highest input data rates. Of course, data may be lost between snapshots, but the memory device 40 can preferably be made arbitrarily large to capture substantial amounts of data. The snapshot mode allows accumulation of data at the highest input rates. Once the snapshot ends, data can be moved or processed where it resides in the memory device 40. In other applications, where it is important to save the data for later review, the data may be copied to main memory for very high speed storage, or copied directly to non-volatile storage. Either of these alternatives further reduce the time between snapshots.

In a third embodiment, the logic device 12 preferably builds the pointer table 64 within a portion of the memory device 40 and only signals the host computer with an interrupt when either the message buffer 62 or the pointer table 64 become full (writes to or above their predetermined maximum addresses). In this embodiment, as the logic device 12 receives and processes a message word (including either a command or status word or a data word), the logic device writes the sixteen bit message word into the next available memory location in the message buffer 62. When the logic device 12 senses a gap in the incoming stream of message words from the fiber-optical receiver 14 (via, for example, gap timer circuitry 50), the logic device 12 will write the address of the next incoming message word (which will be a command word or a status word) into the next available location of the pointer table 64. This pointer table 64 is preferably contained within another portion of the memory device 40. Preferably, a dedicated memory location within the memory device 40 is set aside (for example, the most recent pointer location 66) and contains the address of the pointer in the pointer table 64 that contains the address of the first word of the next message to be written into the message buffer 62. In this embodiment the logic device 12 preferably signals the host computer when either the message buffer 62 or the pointer table 64 are full and must be processed. For example, the logic device 12 may signal the host computer by using a dedicated memory location of the memory device 40 to cause an interrupt (for example, the interrupt vector location 68).

The primary purpose of a bus monitor is to gather and store/display features about the message traffic for analysis of the operation of the data bus. The instrument must generally acquire and store any information it can learn from the message traffic. In the examples given above, the instrument determines and stores for each word or message: the message word data bits, the message word sync pulse polarity, the Manchester validity of all message word data and parity bits, the validity of message word parity as determined by comparing received and computed parity bits, and the time of receipt of the first word in each message. This minimal information allows extensive analysis of data bus performance and display and/or storage of diagnostic data by the host computer. Other features such as building the pointer table and storing the address of the last entry into a pointer table are performed during data acquisition to save processing time during data analysis and display.

It will be appreciated that having either the logic device 12 or the host computer assemble the pointer table is partly redundant in that the flag bits stored with each message word in the message buffer 62 also carry sufficient information to reconstruct message traffic. Each message word is labeled as a data word by a 1101 bit pattern or as a command/status word by a 1110 pattern. In addition to enhancing processing speed, the process of building the pointer table automatically also provides a convenient place to store time stamps associated with each message.

Another mode of operation of the present invention may be particularly useful when normal (less than maximum) amounts of data are being monitored. With infrequent messages, it will take an extended period to fill the message buffer 62 and pointer table 64 within the memory device 40. In such instances, it is preferable to program the host computer to read, process, and display the data as it is accumulated rather than waiting an extended period for either buffer to fill. In this way, the host computer can preferably display the data messages as they are received by the fiber-optical receiver 14 and eliminate the gaps between snapshots. In this embodiment, the logic device 12 preferably includes two methods for initiating snapshots. One preferably starts a new snapshot only after the previous snapshot is ended. The other is preferably a reset input which allows initiation at any time. For situations where data arrives at a high rate and cannot be moved or processed sufficiently rapidly, the message buffer 62 or the pointer table 64 will fill and signal the host with an interrupt that it is time to process and display the stored data. When finished, the host computer initiates another snapshot via the reset input or the restart input to the logic device 12. For situations where data arrives at a low rate, the host computer processes the data as it accumulates. If the host compute r can catch up to the latest stored data, it may choose to restart by signaling the logic device 12 via the reset input. In this manner, the message buffer 62 and pointer table 64 are emptied and reset without ever filling either the message buffer 62 or the pointer table 64, so the snapshot never completes, and no data is lost between snapshots. A difference between the methods of restarting and resetting is that resetting clears the time stamp generator, so that relative timing information is lost between frames when reset is used to begin a snapshot.

Figure 5B:
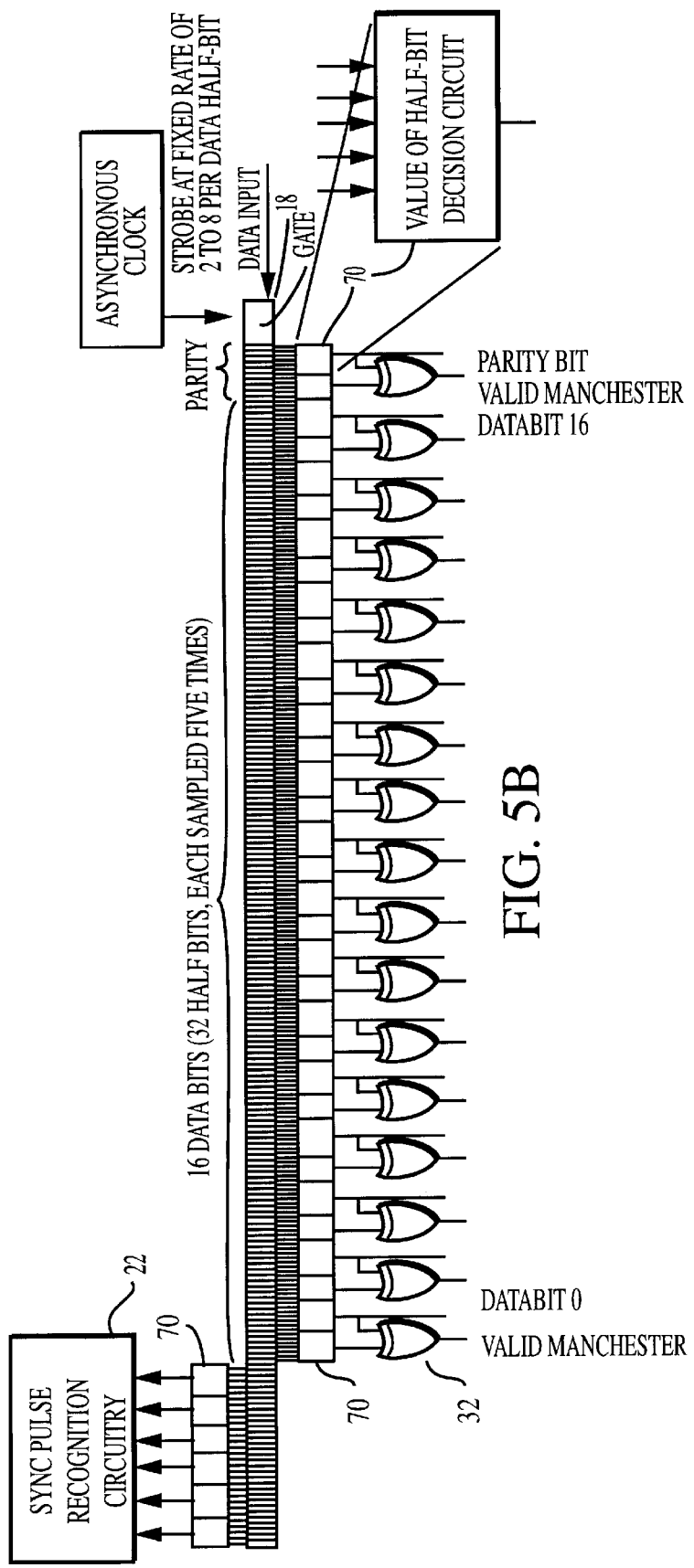

The example presented here of an optical receiver that provides recovered clock pulses and data half bits, and a logical device 12 that provides a serial input register with a position for each of 40 half-bits, shall not constrain the scope of this invention. As another example, the bus monitor 10 may use an oversampling approach, as illustrated in FIG. 5b, in which a considerably less expensive fiber-optical receiver 14 which provides only data may be used with a logical device 12 that provides a serial input register with a plurality (2,3,4,5,6,7, or more) of positions for each data half-bit and an asynchronous clock operating at the same multiple of the expected half-bit rate. FIG. 5a shows the logical device 12 adapted to receive inputs from a receiver that provides data with a synchronous clock signal at the rate of half-bits (as described in connection with FIG. 1) for comparison. Thus, in FIG. 5b, a plurality of successive samples (for example, 5 samples as illustrated in FIG. 5b) of each half-bit reside within register 18. An additional logic circuit 70 decodes the half-bits on the basis of the stored samples. The logic device 12 preferably recognizes the synchronization pulse on the basis of the stored samples, with no clock recovery required. The clock recovery approach requires a more complex fiber-optical receiver, while the oversampling approach requires a faster and larger logic device 12.

The present invention has been described for use with fiber-optical data buses configured in accordance with the AS1773 protocol. As those skilled in the art will appreciate, the invention should not be limited to this specific standard, but may be used with other high speed, serial, asynchronous data buses. Additionally, although the present invention has been described in considerable detail with reference to certain presently preferred embodiments thereof, other embodiments are possible without departing from the spirit and scope of the present invention. Therefore the appended claims should not be limited to the description of the preferred versions contained herein.

I claim:

1. A system for monitoring messages transmitted on a high speed, serial, asynchronous data bus employing Manchester encoding, wherein the data bus transmits the messages as a sequence of optical signals, the messages comprising a plurality of command/status and/or data words, the system comprising:

a) a fiber-optical receiver connected to the data bus and adapted to receive the optical signals and convert each optical signal into a message word containing data bits defining either a command/status word or a data word;

b) a memory device adapted to receive and store the messages, wherein the memory device is partitioned into:

a message buffer comprising a plurality of memory locations each adapted to store a message word, wherein each of the messages in the message buffer has an associated address identifying the first memory location of the message; and a pointer table comprising a plurality of memory locations each adapted to store an address associated with one of the messages in the message buffer; and c) a logic device operationally coupled to the fiber-optical receiver and adapted to serially receive and process each message word, to transfer each message word into one of the memory locations of the message buffer, to generate a command/status word address for the first word of each message representing the address of the memory location within the memory buffer storing one of the command/status words, and to store the command/status word address into one of the memory locations of the pointer table.

2. The system of claim 1 wherein the data bus operates according to the SAE AS1773 20 Mbps multiplexed command/response fiber-optic data bus protocol.

3. The system of claim 1 wherein each of the memory locations in the pointer table is further adapted to store a time stamp associated with each command/status word address stored in the pointer table, the logic device further adapted to calculate a time stamp representing the time that the logic device receives the last word in a message, the logic device storing each time stamp along with the command/status word address into one of the memory locations of the pointer table.

4. The system of claim 1 wherein the memory device further comprises a most recent pointer memory location to store the address of the most recent entry written to the pointer table, the logic device storing the address of the memory location in the pointer table containing the address associated with the next command/status word to be received into the most recent pointer memory location.

5. The system of claim 1 wherein the memory device is operationally coupled to a host computer, the host computer operating under software control to read and process the message words stored into the memory device.

6. The system of claim 5 wherein the logic device signals the host computer when either the message buffer or the pointer table is full.

7. The system of claim 5 wherein the logic device pauses storing of the message words into the message buffer when the message buffer is full or the pointer table is full, and wherein the host computer reads and processes the stored message words during the pause.

8. The system of claim 7 wherein the pointer table is stored in the host computer and wherein the logic device stores the address of each command/status word into an interrupt vector memory location to pass the address to the host computer for the purpose of building the pointer table.

9. The system of claim 5 wherein the logic device continuously transfers message words to the message buffer, and wherein the host computer reads and processes the message words sufficiently fast such that subsequent message words received, processed, and stored by the logic device do not overwrite any of the previously stored message words that have not been processed by the host computer.

10. The system of claim 1 wherein the memory device comprises a dual-port memory.

11. The system of claim 1 wherein each of the memory locations in the message buffer is further adapted to store status flags associated with each message word, the logic device further adapted to generate status flags representing the received status of each message word, the logic device transferring each of the status flags along with each message word into one of the memory locations of the message buffer.

12. The system of claim 11 wherein one of the status flags comprises a parity validity flag, and wherein the logic device receives a parity bit associated with each received message word, the logic device calculating the parity of the message word and comparing the calculated parity to the received parity bit and storing the results of the compare as the parity validity flag.

13. The system of claim 11 wherein the logic device receives a parity bit associated with each received message word, and one of the status flags comprises a Manchester validity flag, and wherein the logic device calculates the Manchester validity of each of the data bits and the parity bit of each received command/status and data word, and stores the calculated Manchester validity as the Manchester validity flag.

14. The system of claim 11 wherein the status flags comprise a command/status word flag and a data word flag that indicate receipt of a command/status word sync pulse and a data word sync pulse respectively, and wherein the logic device senses a sync polarity for each message and sets the appropriate command/status word flag and the data word flag to indicate whether the logic device received a command/status word or a data word.

15. The system of claim 11 wherein each of the memory locations in the pointer table is further adapted to store a time stamp associated with each address stored in the pointer table, the logic device further adapted to calculate a time stamp representing the time that the logic device receives the last word in a message, and wherein the logic device further comprises a multiplexer that receives the status flags generated by the logic device and the calculated time stamp and outputs either the status flags or the time stamp such that the logic device can store either the status flags along with message words or the time stamp along with the command/status word address into the memory device.

16. The system of claim 15 wherein the multiplexer outputs the status flags when the logic device is storing a message word into one of the memory locations of the message buffer and outputs the time stamp when the logic device is storing the command/status word address into one of the memory locations of the pointer table.

17. A method for monitoring messages transmitted on a high speed, serial, asynchronous data bus employing Manchester encoding, wherein the data bus transmits the messages as a sequence of optical signals and wherein the messages comprise a plurality of command, status and data words, the method comprising the steps of:

(a) optically receiving each of the optical signals transmitted on the fiber-optic data bus;

(b) converting each received optical signal into a message word comprising either a command, a status, or a data word;

(c) providing a memory device having a plurality of storage locations adapted to receive and store the messages;

(d) partitioning the memory device into two separate regions comprising:
a message buffer comprising a plurality of memory locations adapted to store either a command, status, or data word, wherein each of the messages in the message buffer has an associated address identifying the first memory location of the message; and
a pointer table comprising a plurality of memory locations each adapted to store an address associated with one of the messages stored in the message buffer;

(e) sequentially storing each message word into one of the memory locations of the message buffer; and (f) for each command and status word received and stored, generating and storing a command/status word address representing the address of the memory location within the memory buffer storing the command or status word into one of the memory locations of the pointer table.

18. The method of claim 17 wherein the memory device further comprises a most recent pointer memory location, the method further comprising the step of storing the address of the memory location in the pointer table containing the address associated with the next received command/status word into the most recent pointer memory location.

19. The method of claim 17 wherein the memory device is operationally coupled to a host computer, the host computer operating under software control to read and process the message words stored into the memory device, the method further comprising the step of signaling the host computer when either the message buffer or the pointer table is full.

20. The method of claim 17 wherein each of the memory locations in the message buffer is further adapted to store status flags associated with each message word, the method further comprising the steps of generating status flags representing the received status of each message word, and transferring each of the status flags along with the message word into one of the memory locations of the message buffer.

21. The method of claim 20 wherein each of the memory locations in the pointer table is further adapted to store a time stamp associated with each address stored in the pointer table, the method further comprising the steps of calculating a time stamp representing the time that the logic device receives the last word in a message, and transferring either the status flags or the time stamp into the memory device along with the message word or the command or status word address.

* * * * *